March 18, 1947.   D. S. MUZZEY, JR., ET AL   2,417,609
ELECTRONIC COMMUTATOR
Original Filed Sept. 8, 1941
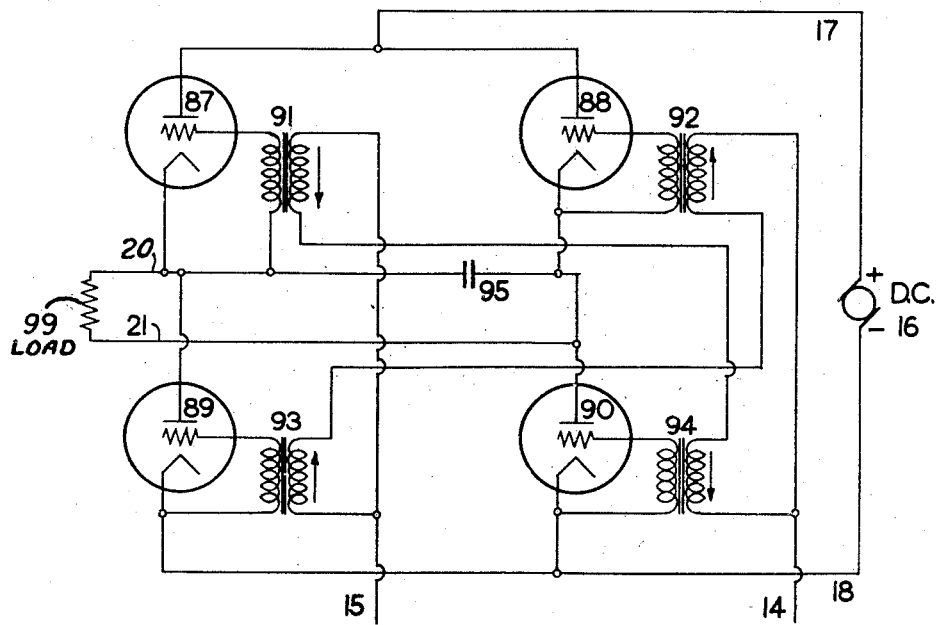
Inventors: David Saville Muzzey, Jr.
Robert DuWayne Miller
By their Attorney:

UNITED STATES PATENT OFFICE 2,417,609

ELECTRONIC COMMUTATOR

David Saville Muzzey, Jr., Alexandria, Va., and Robert Du Wayne Miller, Washington, D. C., assignors to Shell Development Company, San Francisco, Calif., a corporation of Delaware Original application September 8, 1941, Serial No. 410,010. Divided and this application July 28, 1943, Serial No. 496,688

1 Claim. (Cl. 175—363)

This invention relates to a system of synchronous commutation, and has particular application in methods of geophysical exploration of underground formations, wherein an electric current commutated by electronic means is passed through the earth strata between grounded current electrodes, while the potential difference generated in the earth by said current, or due to other causes, is measured between grounded potential electrodes by means of suitable indicating devices.

This application is a division of Patent 2,363,987, issued November 28, 1944.

In exploring the ground by means of commutated direct current, it is customary to use so-called synchronous commutators, adapted to reverse in synchronism, and at a desired frequency, the connections between the source of current and the current electrodes, and the connections beween the indicating devices and the potential electrodes.

The mechanical commutators used for this purpose and described, for example, in U. S. Patents 1,813,845 and 2,204,436, are, however, inherently subject to considerable drawbacks, such as difficulties in mechanically maintaining a frequency of highly constant order which is essential for purposes of geophysical exploration; relatively small range of permissible frequencies, as a mechanical commutator, gives satisfactory operation in exploration work only near the frequency for which it has been designed; sparking difficulties, which are usually aggravated with time and wear, and which give rise to undesirable transient effects; insufficiently fast switching, giving an undesirably long current-off time and resulting in an imperfect square-shape wave form, etc.

It is an object of the present invention to provide an electronic or thyratron commutator especially suitable for use in the electric exploration system of said patent.

It is also an object of this invention to provide an electronic commutator of flexible frequency characteristics, capable of delivering commutated currents of different predetermined constant frequencies within a very wide range, such as from about one-half to about 25 cycles or more.

It is also an object of this invention to provide an electronic commutator capable of extremely fast switching action, whereby current-off time periods may be reduced to extremely small values, such as 0.001 second.

These and other objects and features of this invention will be understood from the following description taken with reference to the attached drawings, wherein:

The drawing shows a circuit diagram of the present arc discharge or thyratron commutator unit.

The single figure of the drawing shows the current-switching electronic commutator of the present invention connected to the D. C. source 16 by lines 17 and 18, a source of approximately square wave-shape current by lines 14 and 15, and to the load 99 by lines 20 and 21. This commutator may comprise four large current carrying arc discharge or thyratron tubes 87, 88, 89 and 90, which are biased so that each thyratron will fire only when a positive voltage pulse is applied to its grid. The primary windings of transformers 91, 92, 93 and 94 are supplied with an approximately square wave current from lines 14 and 15. The secondary winding of each transformer is thus caused to develop a sharp voltage pulse when current flow is initiated in the primary over lines 14—15, and one of the opposite polarity when said current flow is discontinued. The grids of tubes 87 and 90 are connected to the secondary windings of the transformers so as to receive pulses of what shall be called positive polarity when the primaries are supplied with current, that is, at a time when a current of an increasing intensity flows through said primaries, while the grids of tubes 88 and 89 are connected to receive pulses of negative polarity during this same time. On the other hand, when the supply of current to the primaries is discontinued, that is, at a time when a current of a decreasing intensity is flowing through said primaries, the grids of tubes 88 and 89 will receive pulses of positive polarity, while those of tubes 87 and 90 will receive pulses of negative polarity. Assume tubes 87 and 90 to be firing, their grids having received a positive voltage pulse from transformers 91 and 94. In such case, the next positive pulse will be on the grids of tubes 88 and 89 from transformers 92 and 93, and will cause these tubes to fire, which action will extinguish tubes 87 and 90 by means of condenser 95. The voltage applied to the load 99 will alternate in direction, since when tubes 87 and 90 are firing, line 20 is positive with respect to line 21, and when tubes 88 and 89 are firing, line 21 is positive with respect to line 20. In this way, direct current from generator or battery 16 is commutated to give a substantially square wave form current to the load 99 at a frequency depending on that of the current in lines 14 and 15.

We claim as our invention:

In a system for passing a low frequency continuous reversing substantially square wave form current between two output terminals, a commutator circuit comprising two groups each having an equal even number of arc discharge tubes, parallel inductive means for biasing the grids of one group of said tubes in a positive direction in response to a rise in the intensity of the current flowing through said inductive means, and for biasing the grids of the other group of said tubes in a positive direction in response to a fall in the intensity of the current flowing through said inductive means, a plurality of connector means each between the cathode of a tube of the first group and the anode of a tube of the second group, all of said tubes being thus connected in pairs, condenser means connected between said connector means, output terminals connected in parallel with said condenser means between said connector means, a source of direct current, means connecting the positive terminal of said source to the anodes of one-half of the tubes in each of said groups, means for connecting the negative terminal of said source to the cathodes of the other half of the tubes in each of said groups, means for supplying intermittent unidirectional voltage pulses to said parallel inductive means, whereby said two groups of tubes are alternately ignited by the biasing action of said inductive means and extinguished by the action of said condenser means and a low frequency continuous reversing substantially square form current is produced between said output terminals.

DAVID SAVILLE MUZZEY, JR.
ROBERT DU WAYNE MILLER.

REFERENCES CITED

The following references are of record in the file of this patent:

UNITED STATES PATENTS

| Number | Name | Date |
|---|---|---|
| 2,276,974 | Howard | Mar. 17, 1942 |
| 2,294,395 | Evjen | Sept. 1, 1942 |
| 2,314,873 | Evjen | Mar. 30, 1943 |
| 2,334,491 | Jakosky | Nov. 16, 1943 |
| 1,834,889 | Bedford | Dec. 1, 1931 |
| 1,723,888 | Prince | Aug. 6, 1929 |
| 2,166,310 | Lord | July 18, 1939 |